(12) United States Patent
Wu

(10) Patent No.: US 8,297,301 B2
(45) Date of Patent: Oct. 30, 2012

(54) NOZZLE DEVICE FOR PUMP

(76) Inventor: Scott Wu, Taichung (TW)

( * ) Notice: Subject to any disclaimer, the term of this patent is extended or adjusted under 35 U.S.C. 154(b) by 46 days.

(21) Appl. No.: 13/046,846

(22) Filed: Mar. 14, 2011

(65) Prior Publication Data

US 2012/0234401 A1 Sep. 20, 2012

(51) Int. Cl.
*F16K 15/20* (2006.01)

(52) U.S. Cl. ............ 137/231; 137/270; 251/297

(58) Field of Classification Search ............ 137/270, 137/231, 223; 251/297
See application file for complete search history.

(56) References Cited

U.S. PATENT DOCUMENTS

| | | | | |
|---|---|---|---|---|
| 1,333,048 A * | 3/1920 | Webster | ............ | 137/625.32 |
| 2,113,100 A * | 4/1938 | Wheatley | ............ | 137/329.04 |
| 2,566,885 A * | 9/1951 | Hartley | ............ | 251/182 |
| 5,762,095 A * | 6/1998 | Gapinski et al. | ............ | 137/223 |
| 5,819,781 A * | 10/1998 | Wu | ............ | 137/231 |
| 5,960,815 A | 10/1999 | Wang | ............ | 137/118.03 |
| 6,105,600 A * | 8/2000 | Wang | ............ | 137/231 |
| 6,146,116 A * | 11/2000 | Wu et al. | ............ | 417/569 |
| 6,260,572 B1 * | 7/2001 | Wu | ............ | 137/231 |
| 6,978,796 B2 * | 12/2005 | Ostrowiecki | ............ | 137/231 |
| 7,588,048 B2 | 9/2009 | Huang | ............ | 137/231 |
| 2003/0234042 A1 * | 12/2003 | Delorme | ............ | 137/231 |
| 2008/0236675 A1 | 10/2008 | Wang | ............ | 137/231 |

* cited by examiner

*Primary Examiner* — John Rivell
*Assistant Examiner* — R. K. Arundale
(74) *Attorney, Agent, or Firm* — Alan Kamrath; Kamrath IP Lawfirm, PA

(57) ABSTRACT

A nozzle device includes a body, a controller and a core set. The controller is pivotally mounted on the body and is pivotable with respect to the body between a first position and a second position. The core set is slideably received in the body. While the controller is in the first position, the core set is slideable in the chamber and is adapted for coupling with a French type valve. While the controller is in the second position, the core set is fixed and is adapted for coupling with an American type valve.

20 Claims, 20 Drawing Sheets

NOZZLE DEVICE FOR PUMP

BACKGROUND OF THE INVENTION

1. Field of the Invention

The present invention relates generally to a nozzle device for a pump and, more particularly, to a nozzle device for an air pump that can be used with valves of various types.

2. Description of the Related Art

U.S. Pat. No. 5,960,815 shows an inflating device provided with an air nozzle having two connectors of different specifications and engageable with inflation valves of different specifications. The air nozzle is composed of a shell, a distribution valve chamber located in the shell, an obstructing body located in the distribution valve chamber, and two connectors in communication with the distribution valve chamber. The conventional inflating device needs a large size shell for installation of the two connectors such that the shell might interfere with respect to a spoke in operation.

U.S. Publication No. 2008/0236675 shows an air valve connecting device including a mouth attached to one end of a housing and having a compartment for engaging with a U.S. type valve. A barrel is engaged onto the mouth. An actuator is engaged in the housing and has a shank for engaging with the barrel for selectively receiving a French type valve. A tube is engaged in the actuator for engaging with the French type valve, and the tube is extendible into the mouth for selectively engaging with the U.S. type valve. A handle includes a cam member for forcing the actuator to secure either the French type valve or the tube to the actuator, and for forcing the barrel and the mouth to engage with either the French type valve or the U.S. type valve. A cone-shaped segment of the actuator and the tube have a gap therebetween, such that the cone-shaped segment is adapted to be engaged with or be disengaged from a peripheral recess of the tube. The actuator has a stem formed thereon for guiding the tube sliding along a longitudinal direction thereof. The structure thereof, however, is complicated, which inflicts high cost of manufacture.

U.S. Pat. No. 7,588,048 shows an air pump nozzle including a housing with an inflation hole. An inner space of the housing lodges a block assembly seat having a compartment at an end. The compartment lodges a block member having an insertion hole. A needle tube with an air outlet is inserted through the insertion hole and is retained to avoid being disaffiliated from the block member. The air pump nozzle is only adapted for coupling with an American type valve. However, in case the valve is a French type, a connector has to be installed to the nozzle for coupling with the French type valve. The troublesome detachment of the connector and the nozzle are required again if the next valve to be coupled is an American type.

SUMMARY OF THE INVENTION

According to the present invention, the main purpose is to provide a nozzle device including a body, a controller and a core set. The body includes a guiding member. The guiding member has two opposing ends including a first end and a second end. The first end of the guiding member has a chamber formed thereon. The second end of the guiding member, which is adapted for coupling with an air pump, has an aperture formed thereon and in communication with the chamber. The controller is mounted on the body and is pivotable with respect to the guiding member between a first position and a second position. The core set is slideably received in the chamber and includes a needle. While the controller is in the first position, the needle is slideable in the chamber and is adapted for coupling with a French type valve. While the controller is in the second position, the needle is abutted against the first end of the guiding member and is adapted for coupling with an American type valve.

An advantage of the nozzle device according to the present invention is that a cross section of a limiting portion of the core set is substantially the same as that of a chamber of the body, and users can easily change the operating mode by pivoting the controller.

Another advantage of the nozzle device according to the present invention is that the core set is moved along the chamber and that there has no gap between the chamber and the core set. Thus, the structure is simple, and the cost is decreased. Furthermore, the size of the nozzle device is decreased.

Another advantage of the nozzle device according to the present invention is that a positioning mechanism is installed between the body and the controller to retain the controller in one of the first and second positions.

Another advantage of the nozzle device according to the present invention is that the nozzle device comprises a cap with two threaded portions formed thereon so that the nozzle device is able to couple with the French type valve or the American type valve without a connector.

Other advantages and features of the present invention will become apparent from the following description referring to the drawings.

DETAILED DESCRIPTION OF THE PREFERRED EMBODIMENTS

Figure 1:
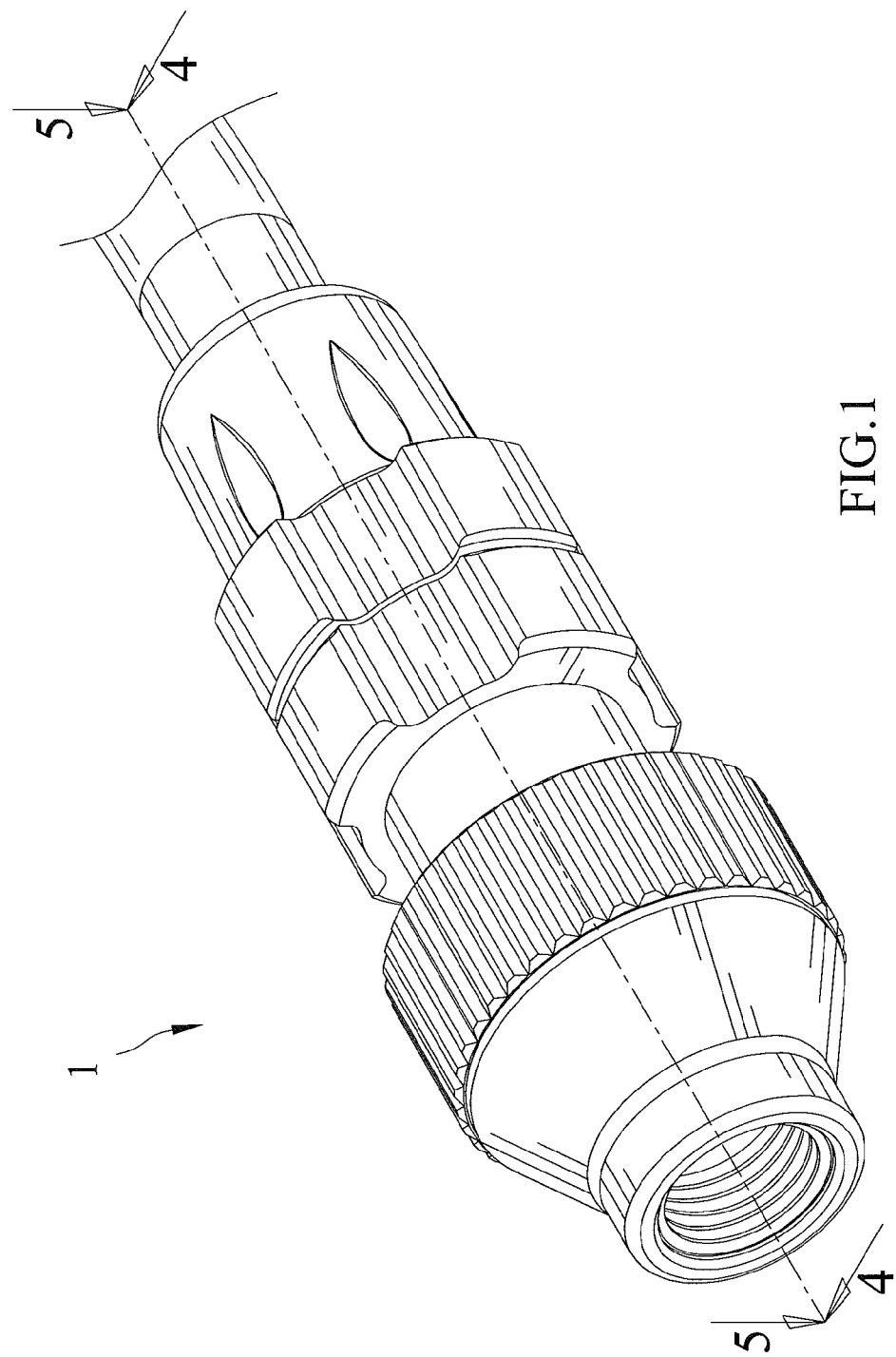
FIG. 1 is a perspective view of a nozzle device according to a first embodiment of the present invention.
Figure 2:
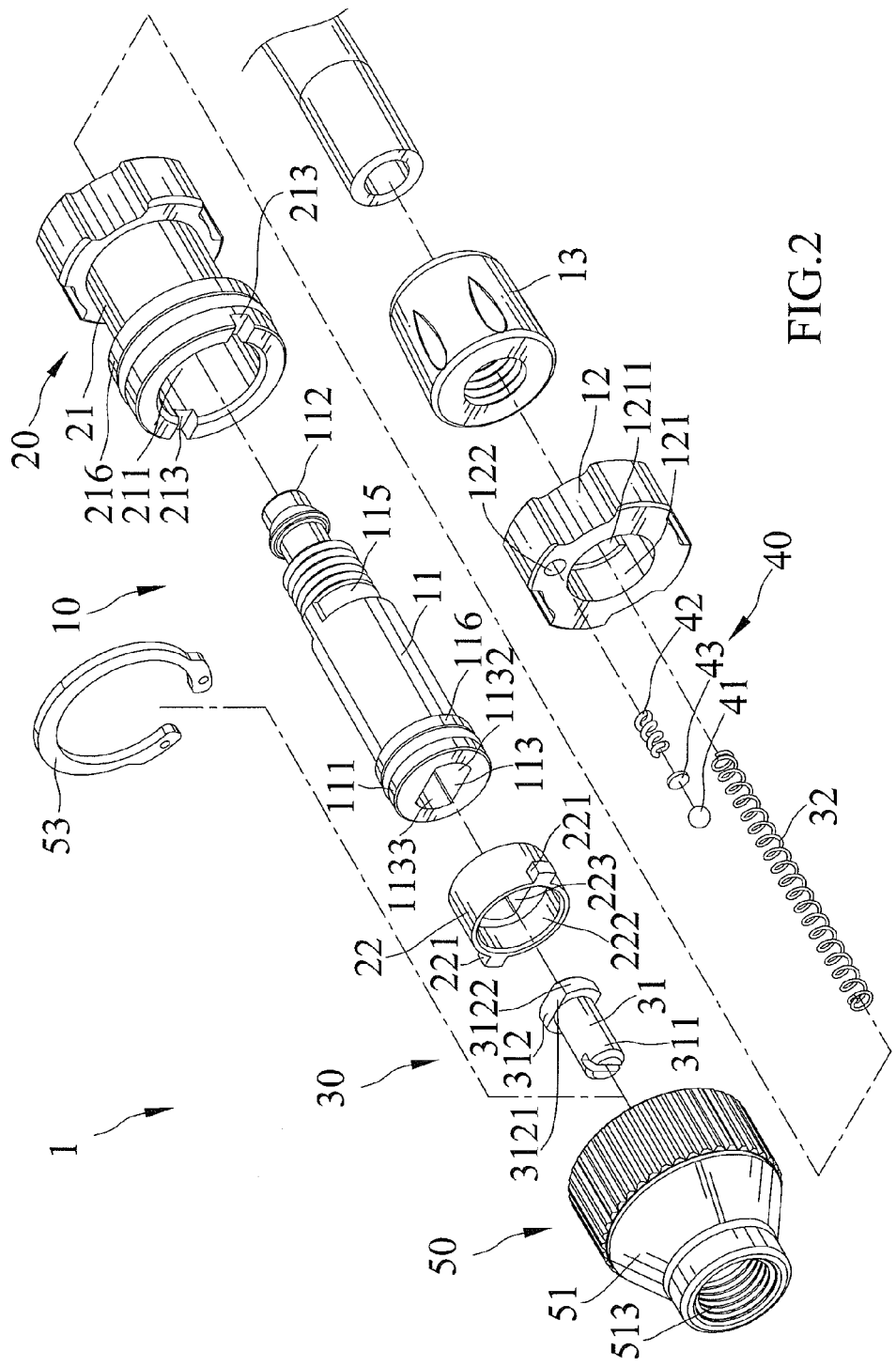
FIG. 2 is an exploded perspective view of the nozzle device of FIG. 1.
Figure 3:
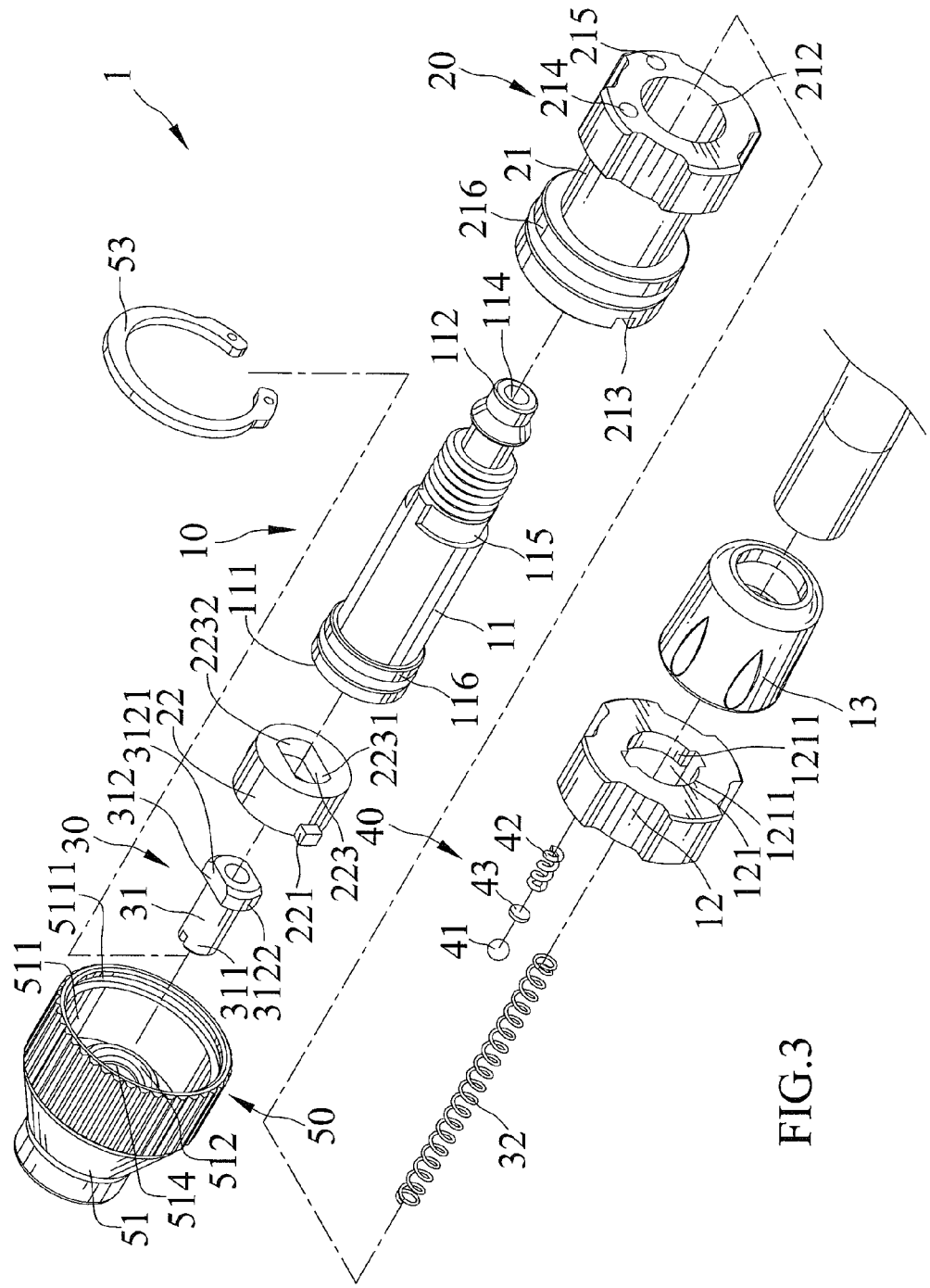
FIG. 3 is an exploded perspective view of the nozzle device taken from a different angle than that of FIG. 2.

Referring to FIGS. 1 through 3 showing a nozzle device 1 according to a first embodiment of the present invention, the nozzle device 1 comprises a body 10, a controller 20 mounted on the body 10, and a core set 30 slideably received in the body 10.

The body 10 includes a guiding member 11, a retainer 12 and a fastener 13. The guiding member 11 and the retainer 12 may be separately formed or may be integrally formed as one piece. The guiding member 11 has two opposing ends including a first end 111 and a second end 112. The first end 111 of the guiding member 11 has a chamber 113 formed thereon for receiving the core set 30. The second end 112 of the guiding member 11, which is adapted for coupling with an air pump or the like, has an aperture 114 formed thereon and in communication with the chamber 113. Preferably, the aperture 114 has an inner diameter smaller than that of the chamber 113. The guiding member 11 further has an engagement face 119 provided between the chamber 113 and the aperture 114. The retainer 12 has a through hole 121 mounted to the guiding member 11 and is disposed between the first end 111 and the second end 112. The through hole 121 has at least one block portion 1211 formed on an inner peripheral wall thereof and corresponding to and installed to at least one groove 115 of the guiding member 11. Preferably, the guiding member 11 has two grooves 115, and the through hole 121 has two block portions 1211 corresponding to and installed to the grooves 115, respectively, such that the retainer 12 is prevented from rotating with respect to the guiding member 11. The fastener 13 is disposed between the second end 112 and the groove 115 and abuts the retainer 12 for preventing the retainer 12 from detaching from the guiding member 11.

The controller 20, which is pivotable with respect to the guiding member 11 between a first position and a second position, includes a housing 21 mounted to the guiding member 11 and a switch 22 coupled to the housing 21. The housing 21 has a first section 211 and a second section 212 both formed on an inner peripheral wall thereof. The second section 212 has an inner diameter smaller than that of the first section 211. The housing 21 further has a limiting face formed between the first and second sections 211 and 212 and abutting a flange 116 of the first end 111 of the guiding member 11 to prevent the housing 21 from moving toward the first end 111 of the guiding member 11. The housing 21 has at least one groove 213 provided on one end thereof distal from the second section 212 and in communication with the first section 211. The switch 22 has at least one emboss 221 protruded from an outer periphery thereof and corresponding to the groove 213. The emboss 221 is coupled to the groove 213, such that the housing 21 and the switch 22 rotate together with respect to the guiding member 11. The switch 22 has a recess 222 provided on one side thereof distal from the second end 112 of the guiding member 11. The recess 222 includes an opening 223 piercing from a bottom side thereof and adapted for insertion of the core set 30.

Figure 4:
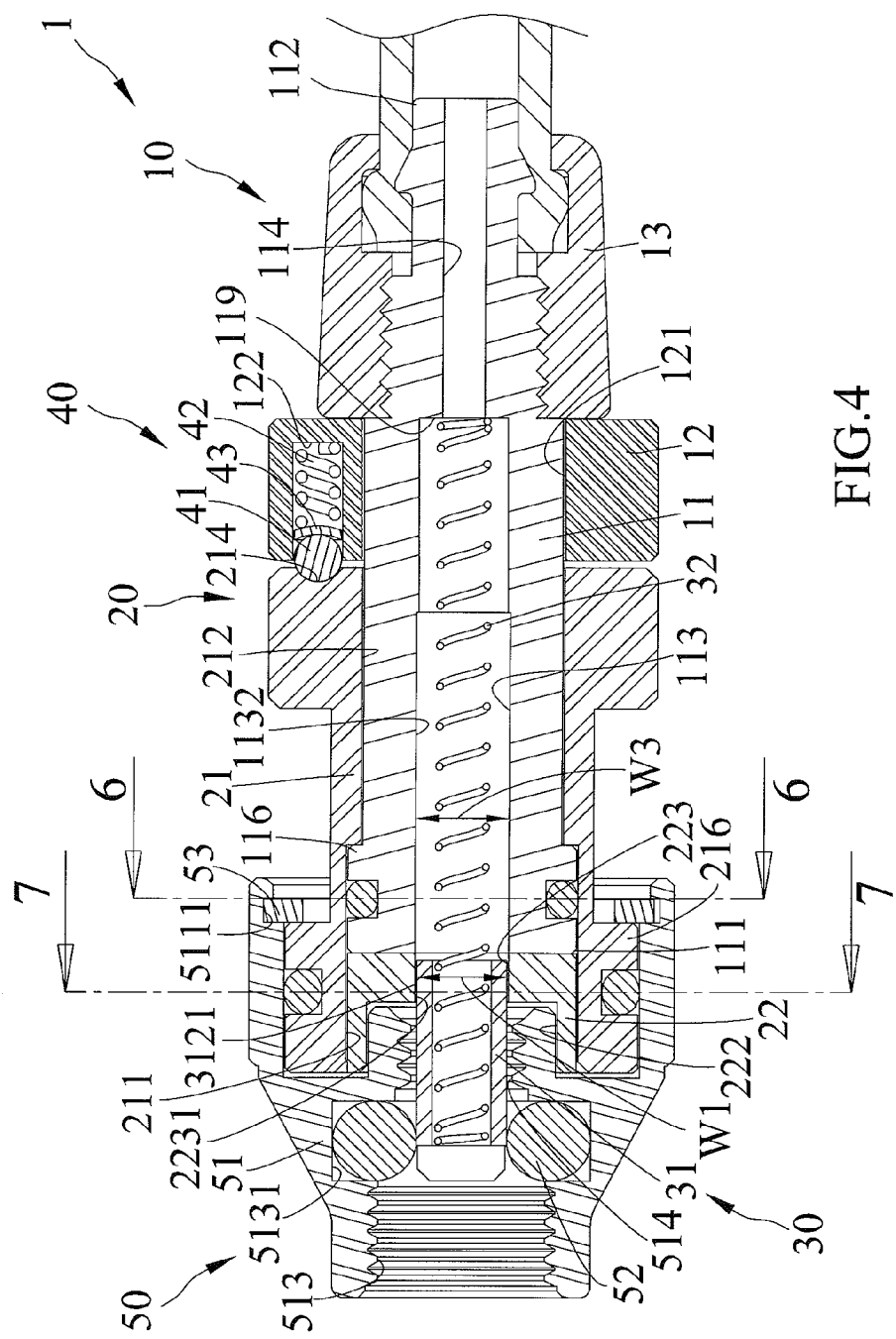
FIG. 4 is a cross-section view taken along line 4-4 of FIG. 1 and shows a controller in a first position.

Referring to FIG. 4, simultaneously, the core set 30 is slideably received in the chamber 113 of the guiding member 11 and includes a needle 31 and a resilient element 32. The needle 31 has an abutment portion 311 and a limiting portion 312. The resilient element 32 is received in the chamber 113 and has two opposing ends including a proximal end abutted against the needle 31 and a distal end engaged with the engagement face 119 to bias the needle 31 away from the second end 112 of the guiding member 11.

The nozzle device 1 comprises a positioning mechanism 40 disposed between the housing 21 of the controller 20 and the retainer 12 of the body 10. The positioning mechanism 40 retains the controller 20 in one of the first and second positions. The positioning mechanism 40 includes a positioning unit 41, an elastic member 42 and a plate 43 disposed between the positioning unit 41 and the elastic member 42. Preferably, the retainer 12 has a slot 122 provided on one side thereof adjacent to the housing 21 of the controller 20, and the housing 21 of the controller 20 has a first cavity 214 and a second cavity 215 both provided on one side thereof adjacent to the retainer 12. The positioning mechanism 40 is installed to the slot 122 of the retainer 12 with one end of the elastic member 42 abutted against the slot 122 and the other end of the elastic member 42 abutted against the plate 43 to longitudinally press the plate 43 and the positioning unit 41. Therefore, the positioning unit 41 is selectively engaged with the first cavity 214 and the second cavity 215. The controller 20 is in the first position and the positioning unit 41 is engaged with the first cavity 214 to prevent the controller 20 from rotating with respect to the body 10 while the first cavity 214 corresponds to the slot 122. The controller 20 is in the second position and the positioning unit 41 is engaged with the second cavity 215 while the second cavity 215 corresponds to the slot 122.

The nozzle device 1 further comprises a cover set 50 coupled to one end of the controller 20 adjacent to the switch 22. The cover set 50 includes a cap 51 mounted on the controller 20, a seal 52 and a fixing unit 53. The cap 51 has a compartment 511 provided on one side thereof adjacent to the controller 20. The compartment 511 has a groove 5111 formed on an inner peripheral wall thereof and a protrusion 512 formed on a bottom wall thereof. The cap 51 further has a mounting portion 513 formed on the other side thereof opposite to the controller 20, and an orifice 514 extending through the protrusion 512 and in communication with the compartment 511 and the mounting portion 513. The mounting portion 513 has a groove 5131 formed on an inner peripheral wall thereof for receiving the seal 52, and a threaded portion (not labeled) adapted for coupling with an American type valve. Additionally, the orifice 514 has a threaded portion (not labeled) adapted for coupling with a French type valve. The fixing unit 53 is installed between the housing 21 of the controller 20 and the cap 51 of the cover set 50. Preferably, the fixing unit 53 is in the form of a C-clip and is abutted against the groove 5111 of the cap 51 and a flange 216 of the housing 21. Thus, the cover set 50 is able to be rotated with respect to the controller 20 and is prevented from detaching from the controller 20.

Figure 5:
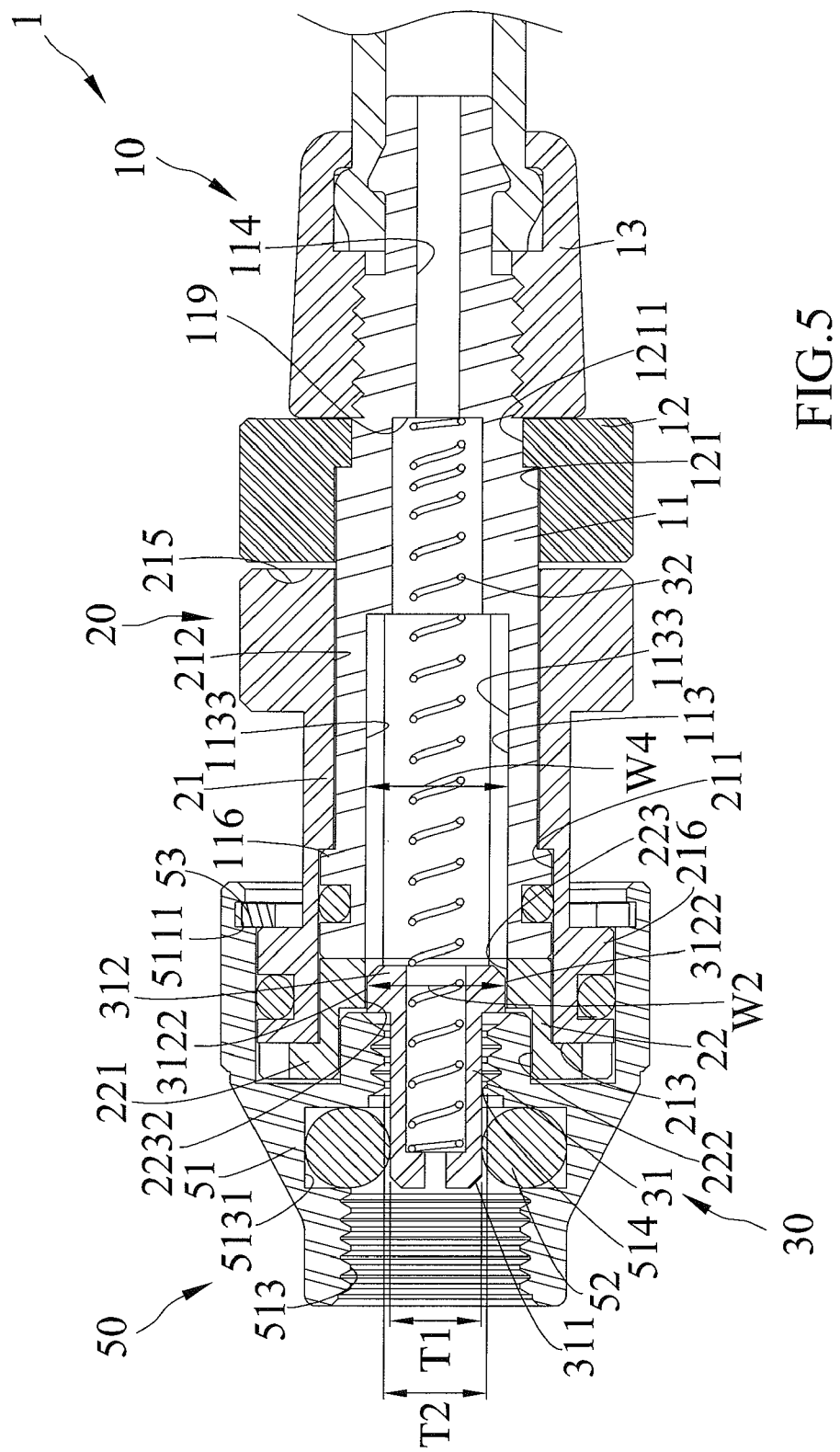
FIG. 5 is a cross-section view taken along line 5-5 of FIG. 1 and shows the controller in the first position.
Figure 6:
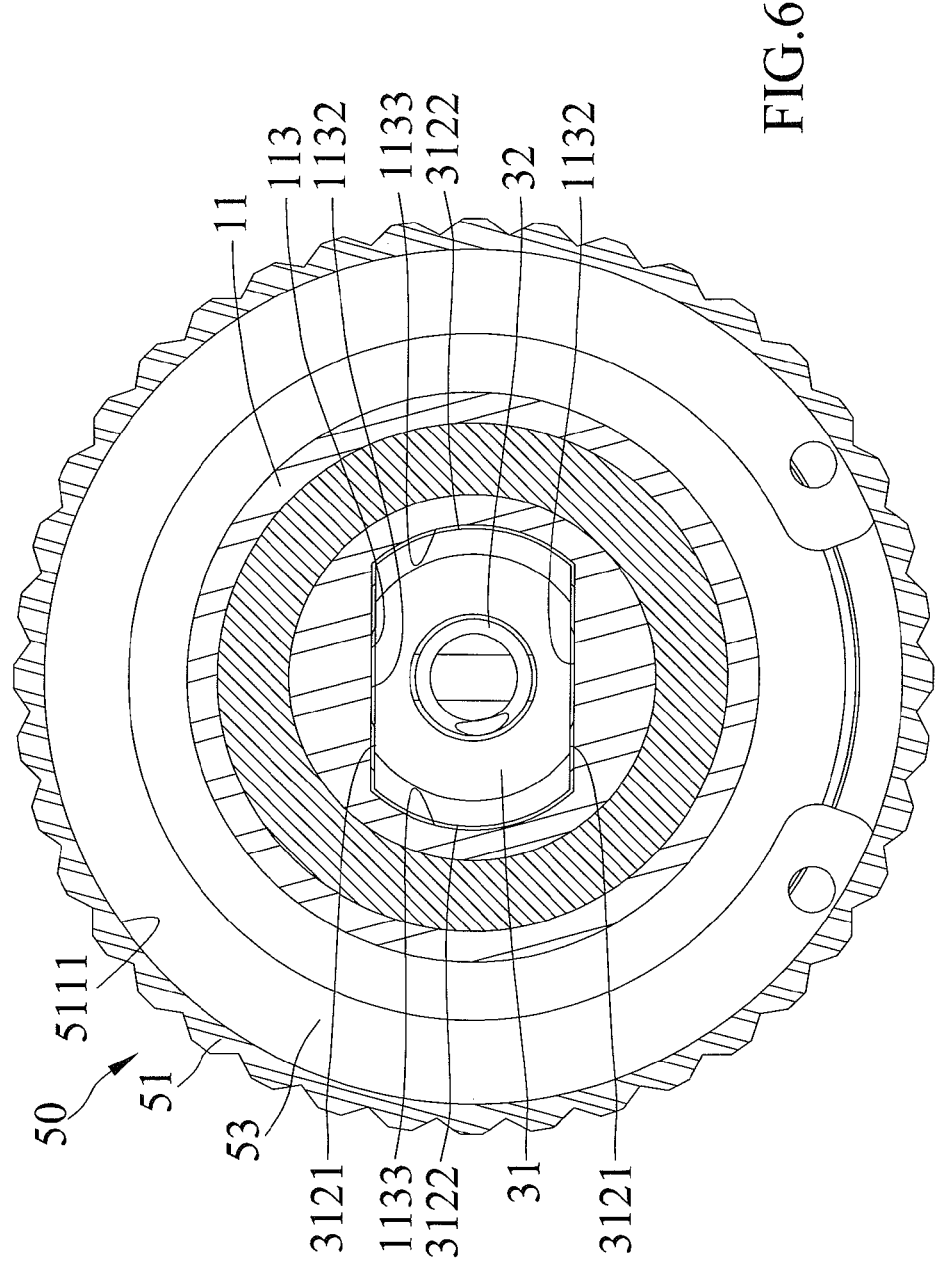
FIG. 6 is a cross-section view taken along line 6-6 of FIG. 4.
Figure 7:
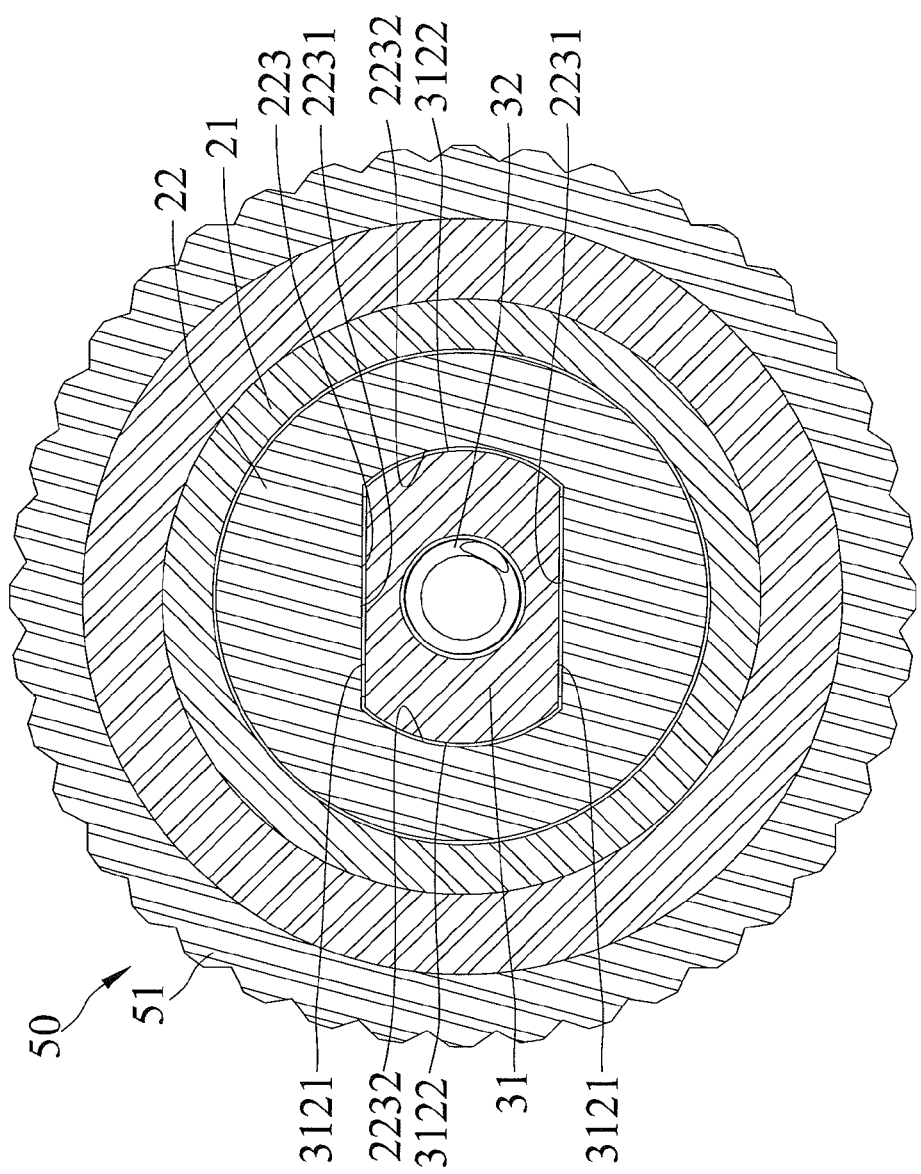
FIG. 7 is a cross-section view taken along line 7-7 of FIG. 4.

Referring to FIGS. 5 through 7, simultaneously, the controller 20 is in the first position. The chamber 113 is delimited by an inner periphery thereof. In the embodiment, the inner periphery of the chamber 113 encloses a non-circle area that delimited the chamber 113. The inner periphery includes two first faces 1132 opposing each other and two second faces 1133 opposing each other. The two second faces 1133 extend between the two first faces 1132. The opening 223 has a cross section the same as that of the chamber 113 and includes two first faces 2231 opposing each other, and two second faces 2232 opposing each other. The two second faces 2232 extend between the two first faces 2231. A cross section of the limiting portion 312 of the needle 31 is substantially the same as but slightly smaller than that of the chamber 113. The limiting portion 312 is delimited by an outer periphery thereof. In the embodiment, the outer periphery of the limiting portion 312 encloses a non-circle area that delimited the limiting portion 312. The outer periphery includes two first surfaces 3121 corresponding to the two first faces 1132 of the chamber 113 and two second surfaces 3122 corresponding to the two second faces 1133 of the chamber 113. The two first surfaces 3121 of the limiting portion 312 have a first width W1 defined therebetween, and the two second surfaces 3122 of the limiting portion 312 have a second width W2 defined therebetween. The first width W1 is a smallest width of the limiting portion 312, and the second width W2 is a largest width of the limiting portion 312. The two first faces 1132 of the chamber 113 have a third width W3 defined therebetween, and the two second faces 1133 of the chamber 113 have a fourth width W4 defined therebetween. The third width W3 is a smallest width of the chamber 113, and the fourth width W4 is the largest width of the chamber 113. The relationship between first, second, third and fourth widths W1, W2, W3 and W4 is:

first width W1<third width W3<second width W2<fourth width W4.

The abutment portion 311 of the needle 31 has a first diameter T1, and the orifice 514 of the cap 51 has a second diameter T2. Preferably, the first diameter T1 is smaller than the second diameter T2, so that the abutment portion 311 of the needle 31 is able to be inserted through the orifice 514 of the cap 51. Additionally, the second width W2 is larger than the second diameter T2, such that the limiting portion 312 of the needle 31 is abutted against the protrusion 512 to prevent the needle 31 from moving toward the mounting portion 513 of the cap 51.

Figure 8:
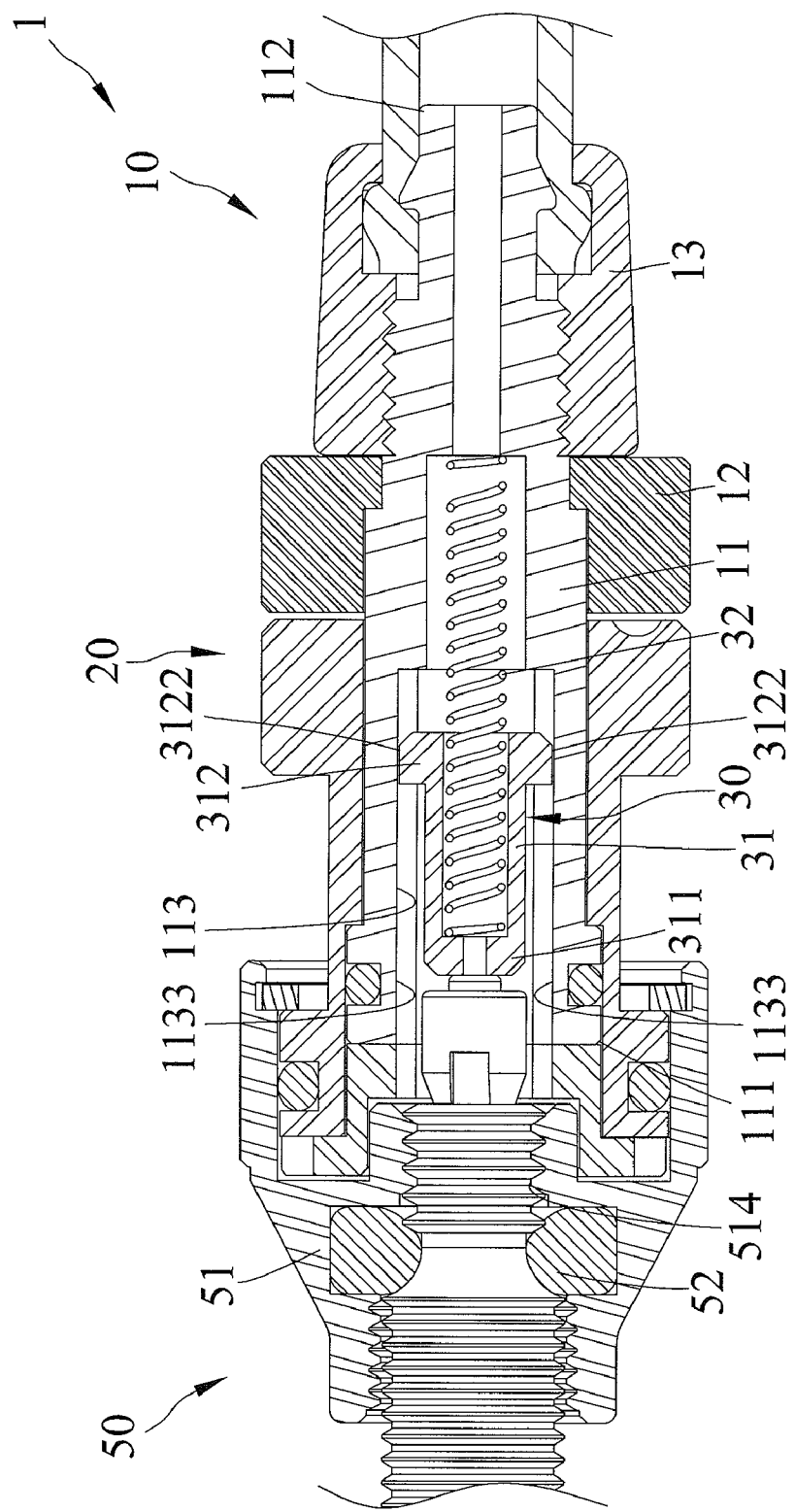
FIG. 8 is a continued cross-section view of FIG. 5 and shows the nozzle device coupling with a French type valve.

While the controller 20 is in the first position, the first surface 3121 of the limiting portion 312 corresponds to the first face 1132 of the chamber 113, and the second surface 3122 of the limiting portion 312 corresponds to the second face 1133 of the chamber 113. Hence, the needle 31 is slideable in the chamber 113. While the nozzle device 1 is coupled with the French type valve (as shown in FIG. 8), the needle 31 of the core set 30 is pressed to move toward the second end 112 of the guiding member 11, such that a head portion of the French type valve is able to be received in the chamber 113 of the guiding member 11. Specifically, the threaded portion of the orifice 514 of the cap 51 corresponds to and is coupled with a screw portion of the French type valve, and a shoulder portion of the French type valve is abutted against the seal 52 to provide an air tight seal.

Figure 9:
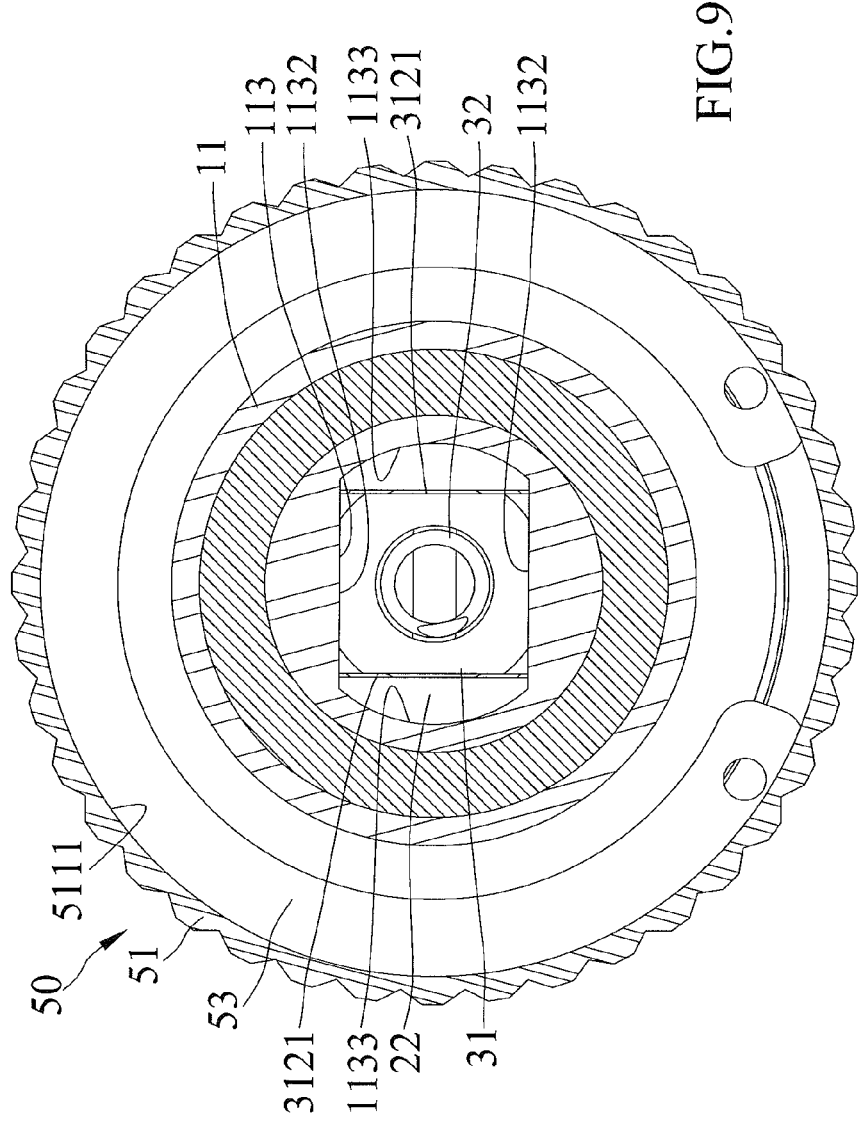
FIG. 9 is a continued cross-section view of FIG. 6 and shows the controller in a second position.
Figure 10:
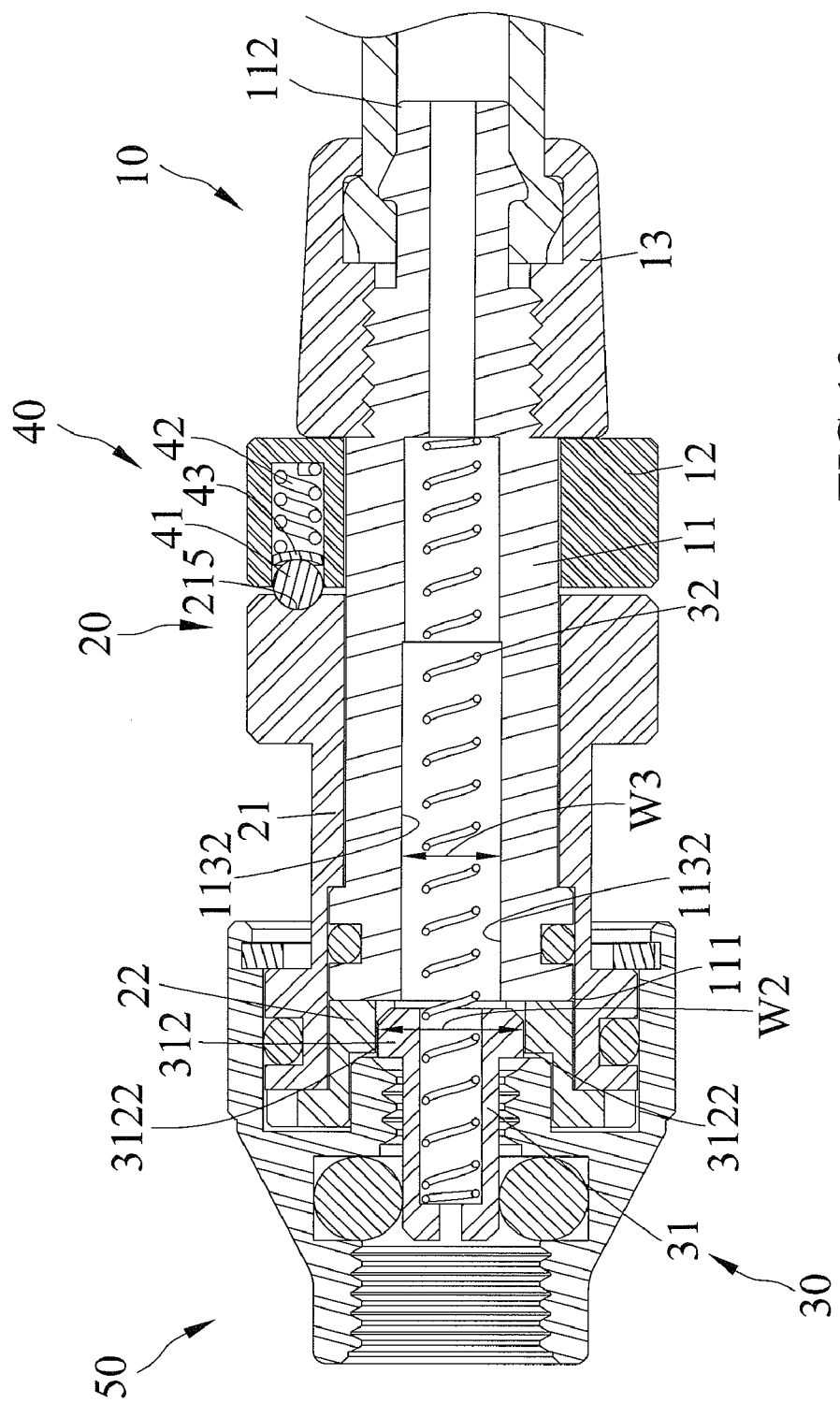
FIG. 10 is a continued cross-section view of FIG. 4 and shows the controller in the second position.
Figure 11:
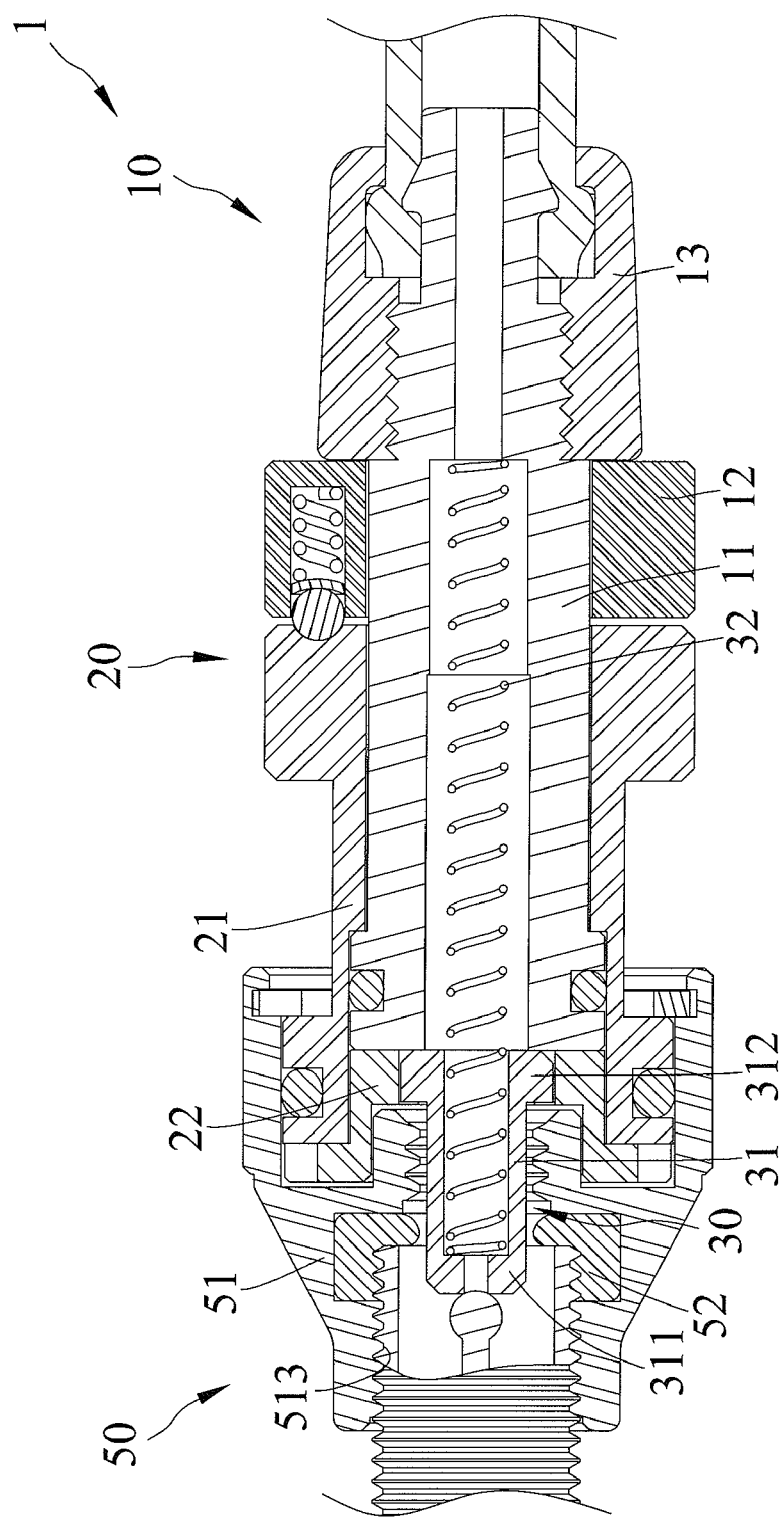
FIG. 11 is a continued cross-section view of FIG. 10 and shows the nozzle device coupling with an American type valve.
Figure 12:
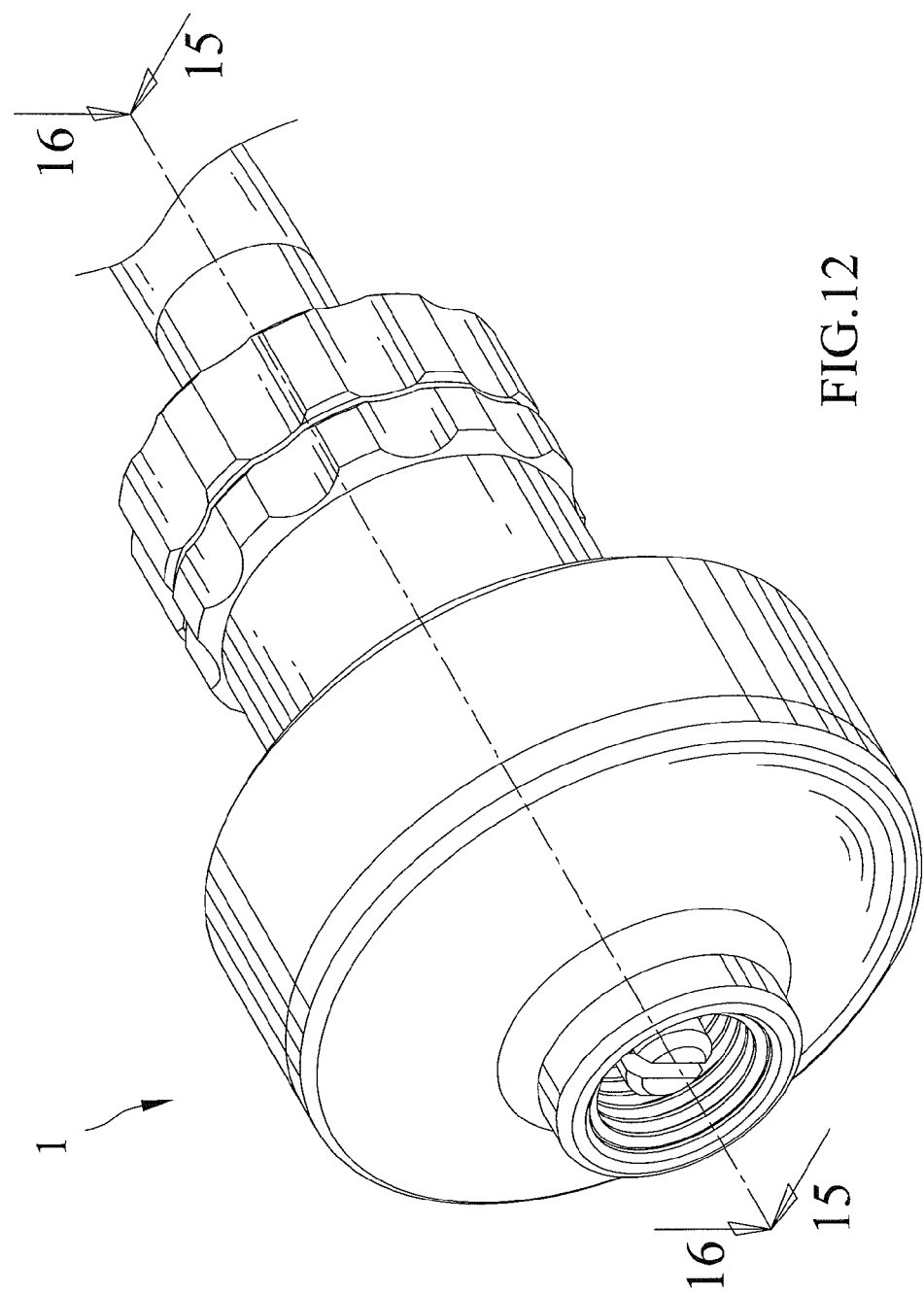
FIG. 12 is a perspective view of a nozzle device according to a second embodiment of the present invention.
Figure 13:
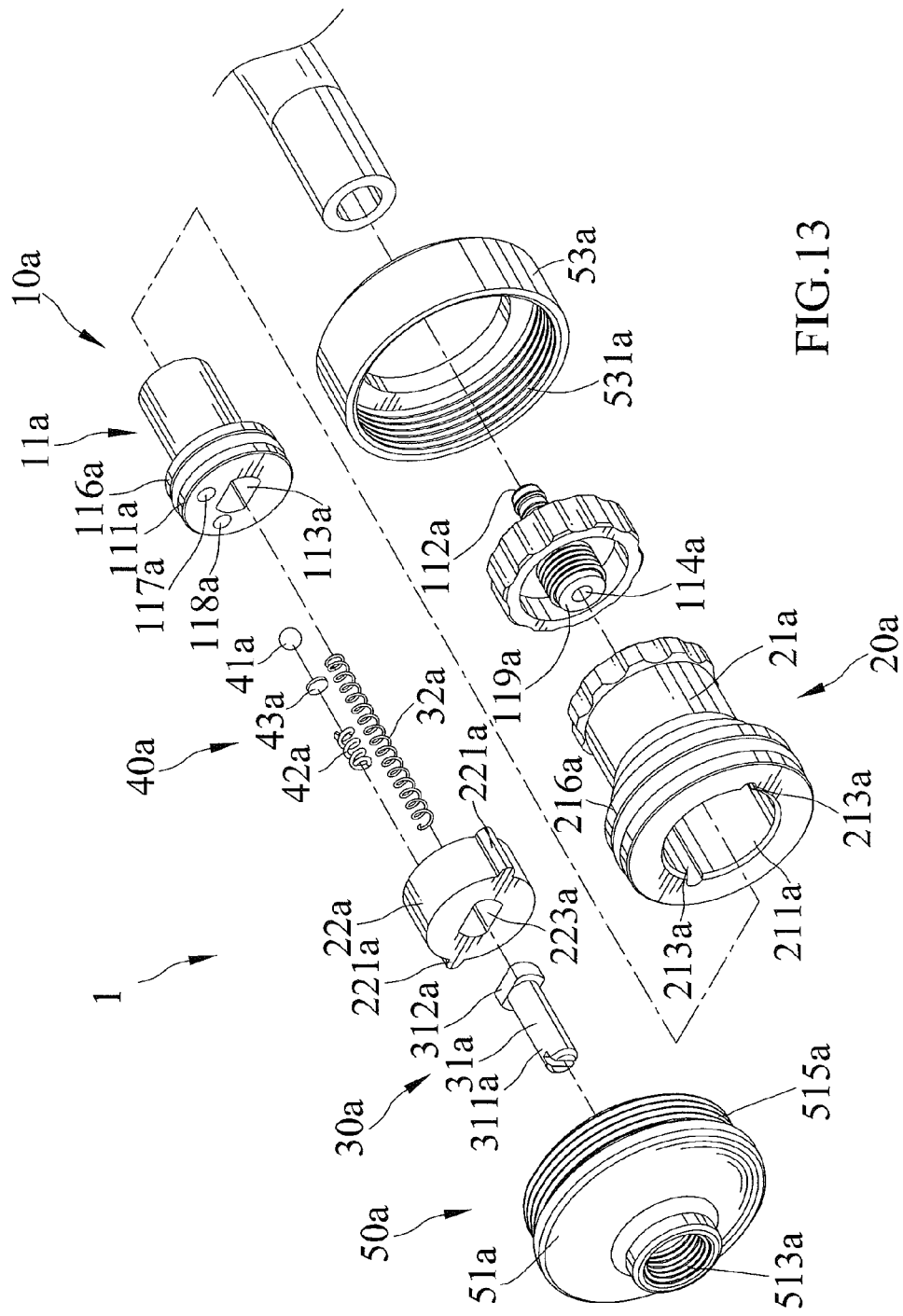
FIG. 13 is an exploded perspective view of the nozzle device of FIG. 12.
Figure 14:
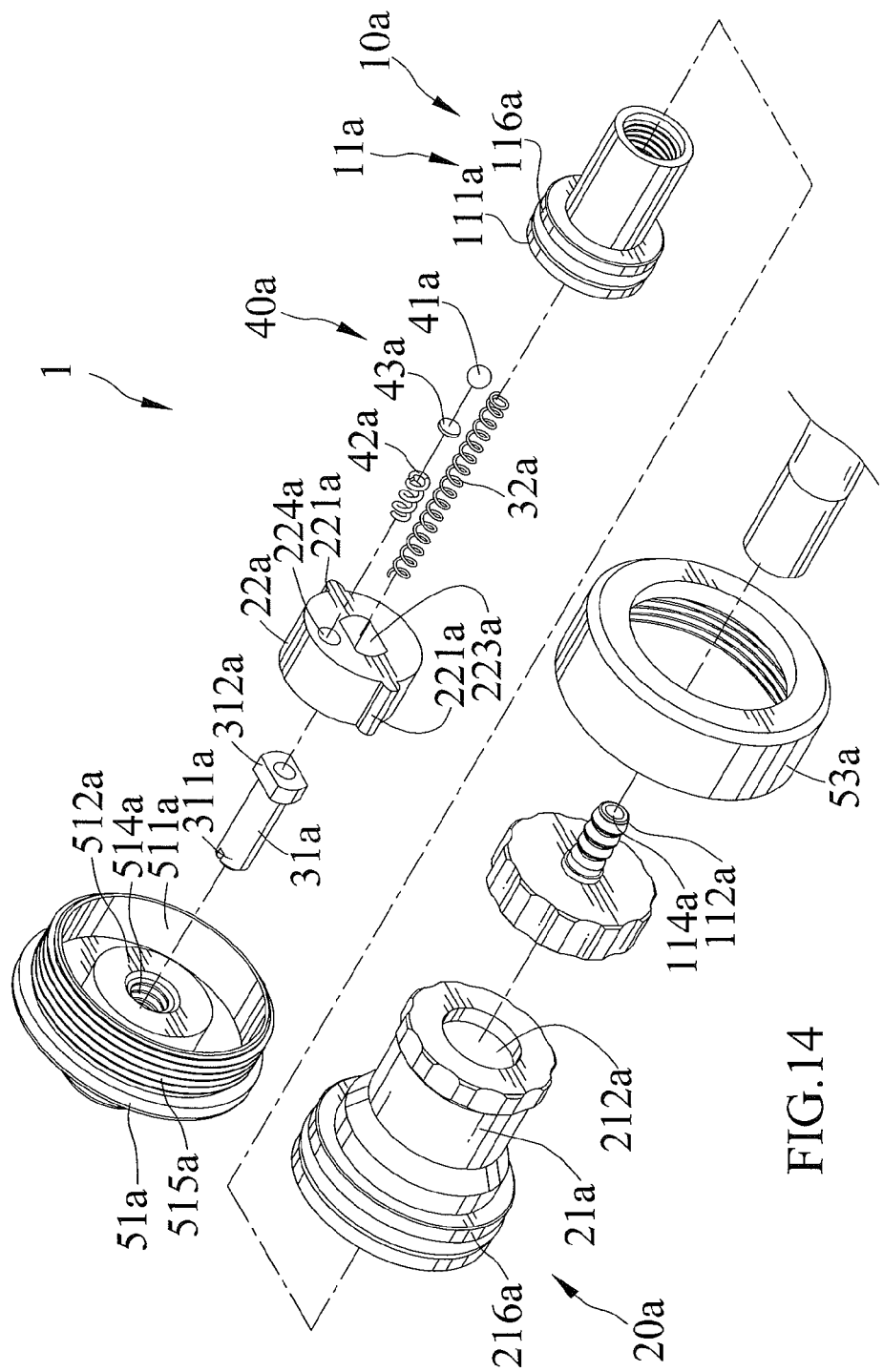
FIG. 14 is an exploded perspective view of the nozzle device taken from a different angle than that of FIG. 13.
Figure 15:
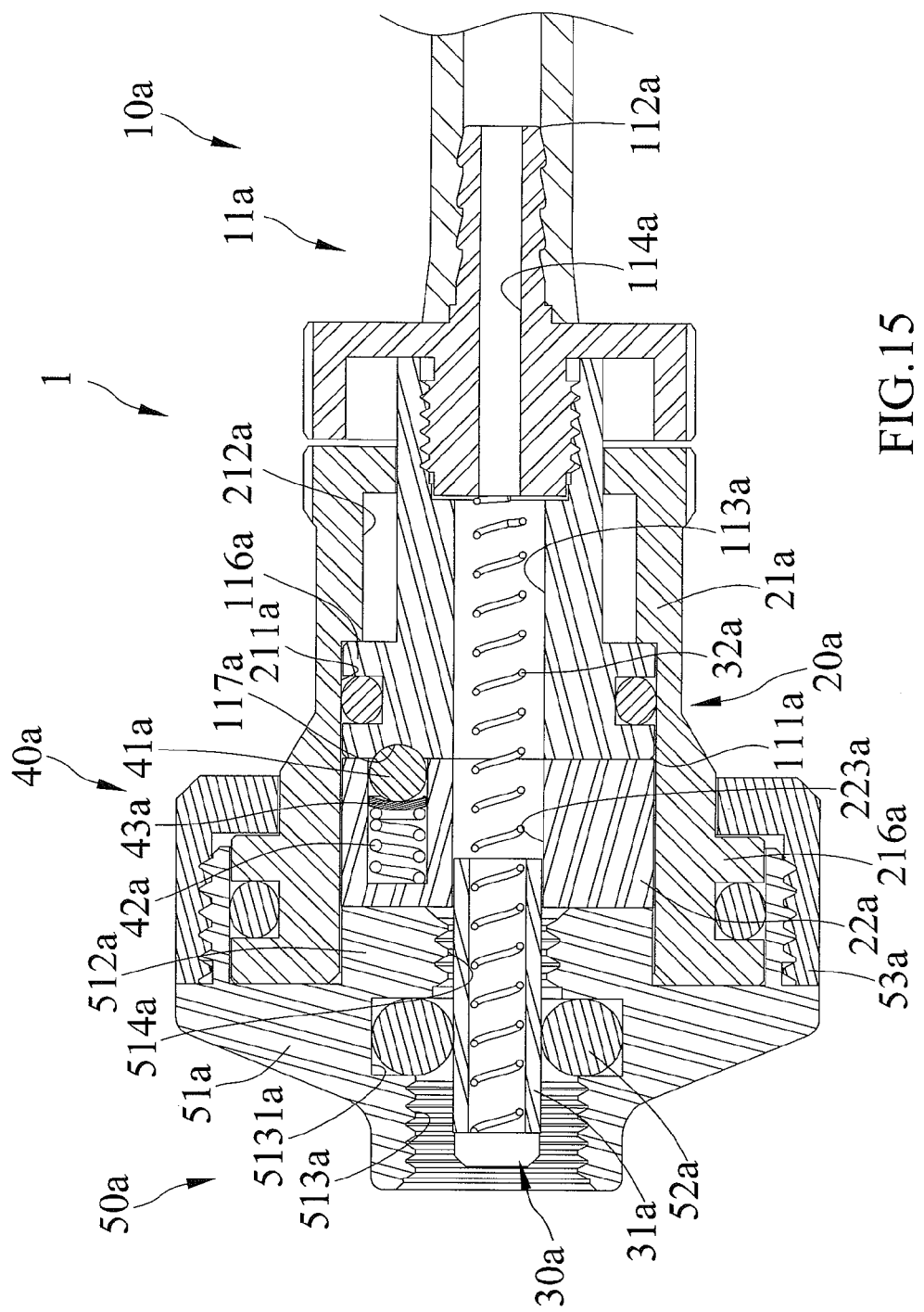
FIG. 15 is a cross-section view taken along line 15-15 of FIG. 12 and shows a controller in a first position.
Figure 16:
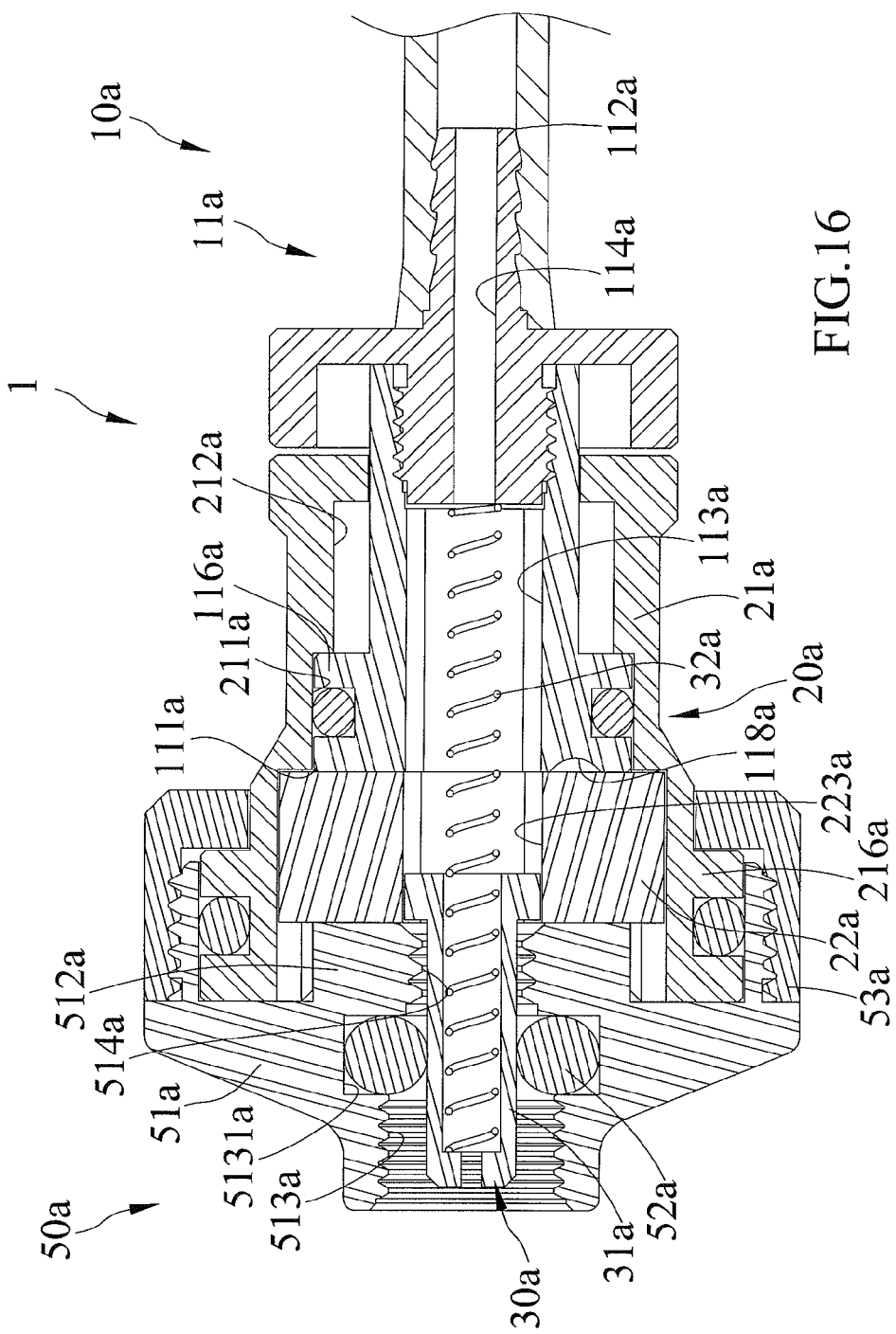
FIG. 16 is a cross-section view taken along line 16-16 of FIG. 12 and shows the controller in the first position.
Figure 17:
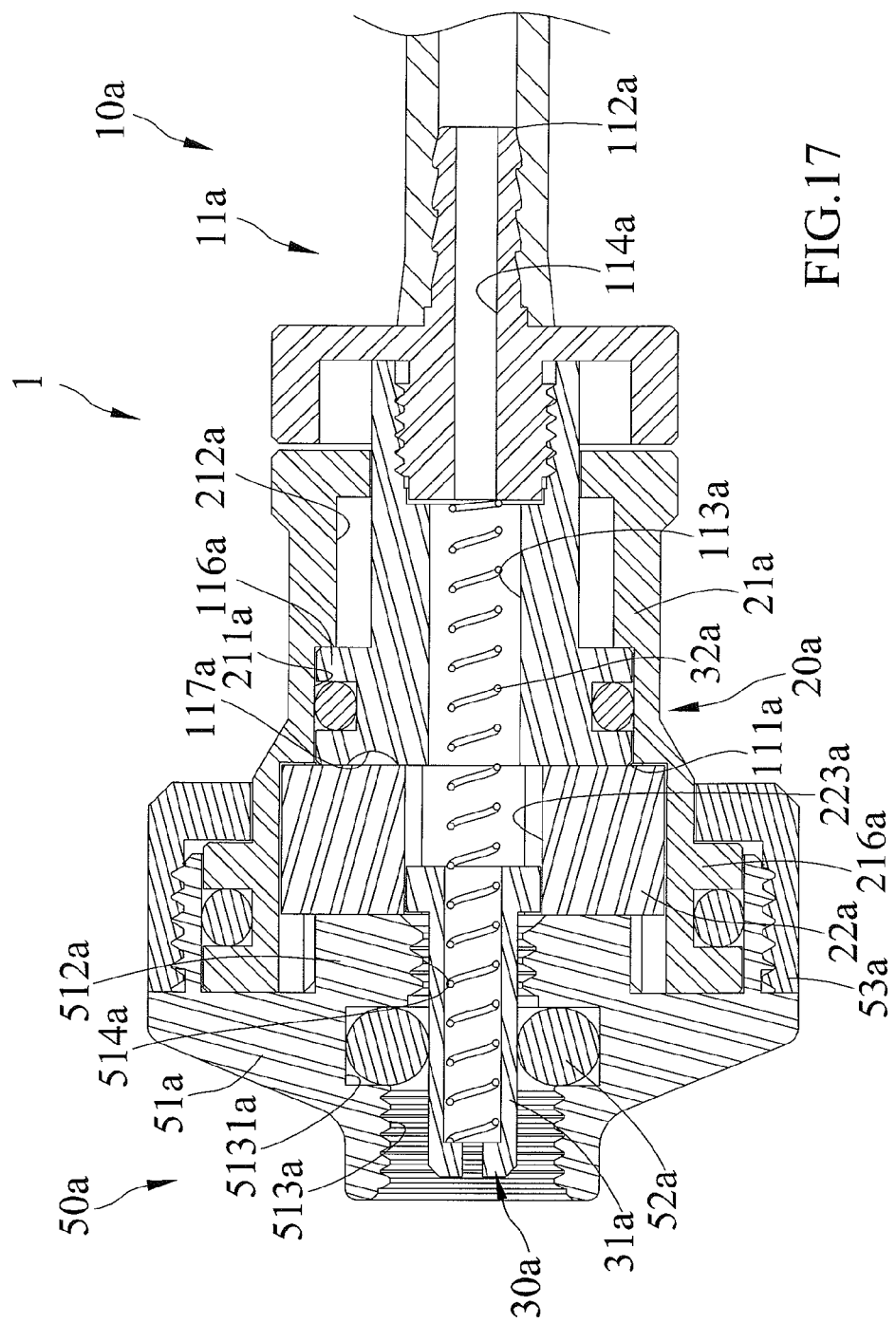
FIG. 17 is a continued cross-section view of FIG. 15 and shows the controller in a second position.

Referring to FIGS. 9 and 10, the controller 20 is in the second position. The needle 31 of the core set 30 is rotated with respect to the guiding member 11 of the body 10 by the switch 22 of the controller 20. While the controller 20 is in the second position, the first surface 3121 of the limiting portion 312 corresponds to the second face 1133 of the chamber 113 and the second surface 3122 of the limiting portion 312 corresponds to the first face 1132 of the chamber 113. The limiting portion 312 of the needle 31 abuts against the first end 111 of the guiding member 11 to prevent the needle 31 from moving toward the second end 112 of the guiding member 11 since the third width W3 of the chamber 113 is smaller than the second width W2 of the limiting portion 312. While the nozzle device 1 is coupled with the American type valve (as shown in FIG. 11), the threaded portion of the mounting portion 513 of the cap 51 corresponds to and is coupled with a screw portion of the American type valve, and a distal end of the American type valve is abutted against the seal 52 to provide an air tight seal. Specifically, a pin of the American type valve is pressed by the abutment portion 311 of the needle 31 in order to open a an air door of the American type valve.

Referring to FIGS. 12 through 17, there is shown a nozzle device 1 of a second embodiment according to the present invention. The second embodiment is substantially identical to the first embodiment. The nozzle device 1 in accordance with the second embodiment includes a body 10a, a controller 20a mounted on the body 10a, and a core set 30a slideably received in the body 10a.

The body 10a includes a guiding member 11a having two opposing ends including a first end 111a and a second end 112a. The first end 111a of the guiding member 11a has a chamber 113a formed thereon for receiving the core set 30a. The second end 112a of the guiding member 11a, which is adapted for coupling with an air pump or the like, has an aperture 114a formed thereon and in communication with the chamber 113a. Preferably, the aperture 114a has an inner diameter smaller than that of the chamber 113a. The guiding member 11a further has an engagement face 119a provided between the chamber 113a and the aperture 114a.

The controller 20a, which is pivotable with respect to the guiding member 11a between a first position and a second position, includes a housing 21a mounted to the guiding member 11a and a switch 22a coupled to the housing 21a. The housing 21a has a first section 211a and a second section 212a both formed on an inner peripheral wall thereof. The second section 212a has an inner diameter smaller than that of the first section 211a. The housing 21a further has a limiting face formed between the first and second sections 211a and 212a and abuts a flange 116a of the first end 111a of the guiding member 11a to prevent the housing 21a from moving toward the first end 111a of the guiding member 11a. The housing 21a has at least one groove 213a provided on the first section 211a thereof. The switch 22a has at least one emboss 221a protruded from an outer periphery thereof and corresponding to the groove 213a. The emboss 211a is coupled to the groove 213a, such that the housing 21a and the switch 22a would rotate together with respect to the guiding member 11a. The switch 22a has an opening 223a piercing from one side thereof distal from the second end 112a of the guiding member 11a and adapted for insertion of the core set 30a.

The core set 30a includes a needle 31a and a resilient element 32a. The needle 31a has an abutment portion 311a and a limiting portion 312a. The resilient element 32a is received in the chamber 113a and has two opposing ends including a proximal end abutted against the needle 31a and a distal end engaged with the engagement face 119a to bias the needle 31a away from the second end 112a of the guiding member 11a.

The nozzle device 1 in accordance with the second embodiment includes a positioning mechanism 40a disposed between the switch 22a of the controller 20a and the guiding member 11a of the body 10a. The positioning mechanism 40a retains the controller 20a in one of the first and second positions. The positioning mechanism 40a includes a positioning unit 41a, an elastic member 42a and a plate 43a disposed between the positioning unit 41a and the elastic member 42a. Preferably, the switch 22a has a slot 224a provided on one side thereof adjacent to the guiding member 11a, and the guiding member 11a has a first cavity 117a and a second cavity 118a both provided on one side thereof adjacent to the switch 22a. The positioning mechanism 40a is installed to the slot 224a of the switch 22a with one end of the elastic member 42a abutted against the slot 224a and the other end of the elastic member 42 abutted against the plate 43a to longitudinally press the plate 43a and the positioning unit 41a. Therefore, the positioning unit 41a is selectively engaged with the first cavity 117a and the second cavity 118a. The controller 20a is in the first position and the positioning unit 41a is engaged with the first cavity 117a to prevent the controller 20a from rotating with respect to the body 10a while the first cavity 117a corresponds to the slot 224a. The controller 20a is in the second position and the positioning unit 41a is engaged with the second cavity 118a while the second cavity 118a corresponds to the slot 224a.

The nozzle device 1 in accordance with the second embodiment further comprises a cover set 50a coupled to one end of the controller 20a adjacent to the switch 22a. The cover set 50a includes a cap 51a mounted on the controller 20a, a seal 52a and a fixing unit 53a. The cap 51a has an outer threaded section 515a provided on an outer periphery thereof, and a compartment 511a provided on one side thereof adjacent to the controller 20a. The compartment 511a has a protrusion 512a formed on a bottom wall thereof. The cap 51a further has a mounting portion 513a formed on the other side thereof opposite to the controller 20a, and an orifice 514a extending through the protrusion 512a and in communication with the compartment 511a and the mounting portion 513a. The mounting portion 513a has a groove 5131a formed on an inner peripheral wall thereof for receiving the seal 52a. The fixing unit 53a has an inner threaded section 531a corresponding to and coupled to the outer threaded section 515a of the cap 51a. The fixing unit 53a is abutted against a flange 216a of the housing 21a, such that the cover set 50a is able to be rotated with respect to the controller 20a and is prevented from detaching from the controller 20a.

The body 10, controller 20 and core set 30 have been described in relation to the first embodiment. While the controller 20a is in the first position, the nozzle device 1 is adapted for coupling with the French type valve. While the controller 20a is in the second position, the nozzle device 1 is adapted for coupling with the American type valve.

Figure 18:
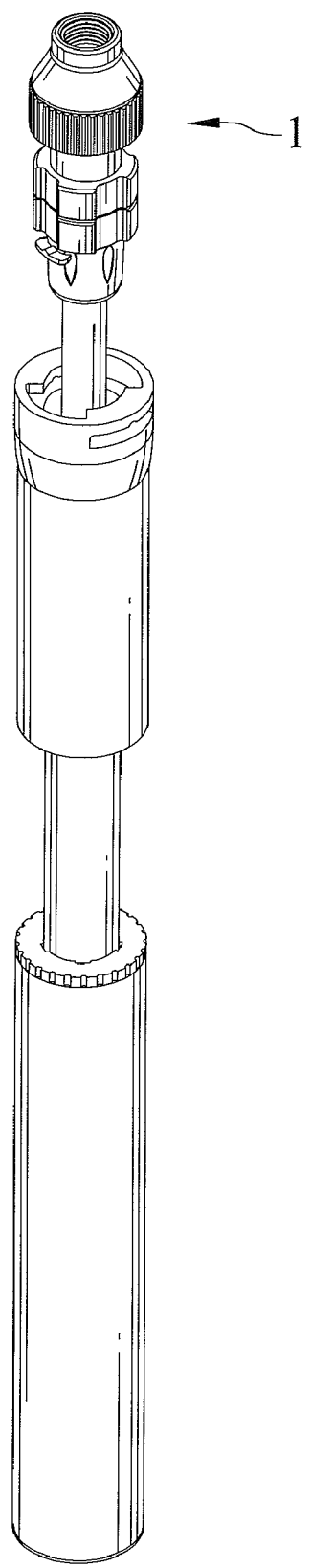
FIG. 18 shows the nozzle device coupled to a mini pump.
Figure 19:
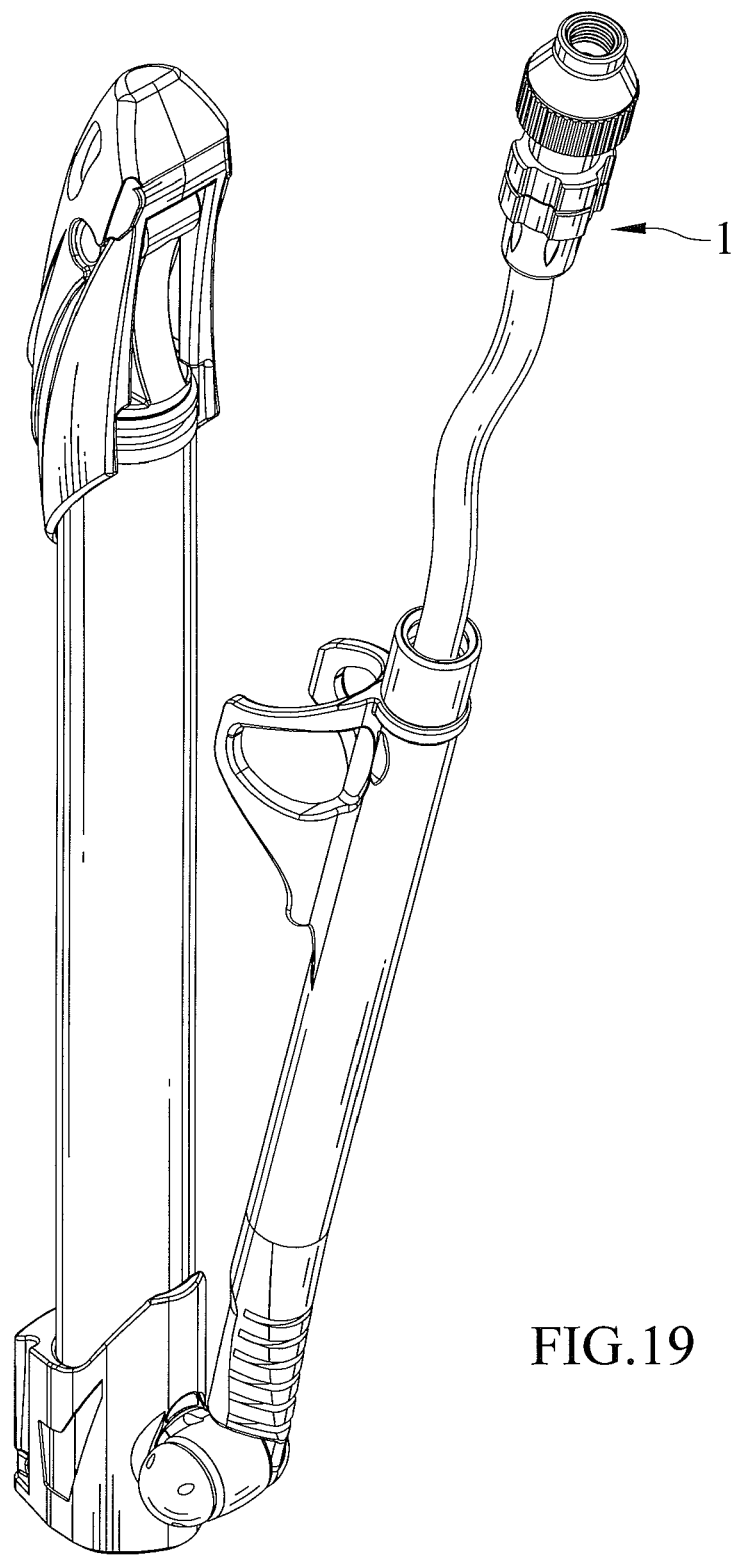
FIG. 19 shows the nozzle device coupled to a frame floor pump.
Figure 20:
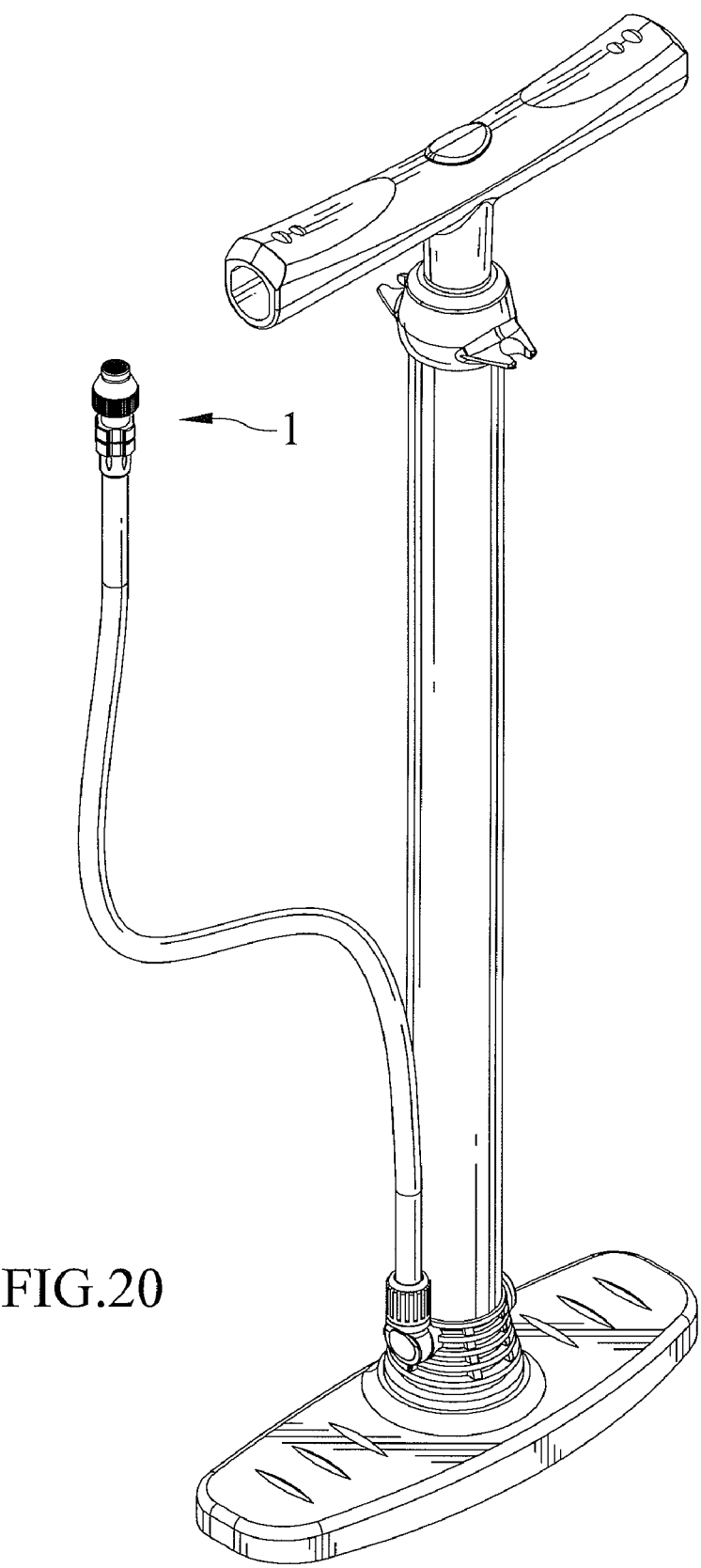
FIG. 20 shows the nozzle device coupled to a floor pump.

The nozzle device 1 is adapted for coupling with a mini pump (as shown in FIG. 18), or a frame floor pump (as shown in FIG. 19), or a floor pump (as shown in FIG. 20). Therefore, the nozzle device 1 according to the present invention is able to be coupled with all kinds of air pumps.

What is claimed is:

1. A nozzle device comprising:
a body including a guiding member having two opposing ends including a first end and a second end, with the first end of the guiding member having a chamber formed thereon, with the second end of the guiding member adapted for coupling with an air pump and having an aperture formed thereon and in communication with the chamber;
a controller mounted on the body and pivotable with respect to the guiding member between a first position and a second position; and
a core set slideably received in the chamber and including a needle having a limiting portion delimited by an outer periphery thereof, with the outer periphery of the limiting portion enclosing a non-circle area that delimited the limiting portion, with the limiting portion having a first width being a smallest width thereof and a second width being a largest width thereof, with the chamber delimited by an inner periphery thereof, with the inner periphery of the chamber enclosing a non-circle area that delimited the chamber, with the chamber having a third width being a smallest width thereof, with the chamber having a fourth width being the largest width thereof;
wherein the relationship between the first, second, third and fourth widths is first width<third width<second width<fourth width;
wherein while the controller is in the first position, the needle is slideable in the chamber and is adapted for coupling with a French type valve;
wherein while the controller is in the second position, the needle is abutted against the first end of the guiding member and is adapted for coupling with an American type valve.

2. The nozzle device as claimed in claim 1, wherein the core set includes a resilient element, wherein the guiding member further has an engagement face provided between the chamber and the aperture, wherein the resilient element is received in the chamber and has two opposing ends including a proximal end abutted against the needle and a distal end engaged with the engagement face to bias the needle away from the second end of the guiding member.

3. The nozzle device as claimed in claim 1 further comprising a positioning mechanism disposed between the controller and the body, wherein the positioning mechanism retains the controller in one of the first and second positions.

4. The nozzle device as claimed in claim 3, wherein the body includes a retainer, wherein the retainer has a through hole mounted to the guiding member and is disposed between the first end and the second end, wherein the retainer has a slot provided on one side thereof adjacent to the controller, wherein the controller has a first cavity and a second cavity both provided on one side thereof adjacent to the retainer, wherein the positioning mechanism is installed to the slot of the retainer and is selectively engaged with the first cavity and the second cavity.

5. A nozzle device comprising:
a body including a guiding member and a retainer, with the guiding member having two opposing ends including a first end and a second end, with the first end of the guiding member having a chamber formed thereon, with the second end of the guiding member adapted for coupling with an air pump and having an aperture formed thereon and in communication with the chamber, with the retainer having a through hole mounted to the guiding member and disposed between the first end and the second end, with the through hole having at least one block portion formed on an inner peripheral wall thereof and corresponding to and installed to at least one groove of the guiding member, with the retainer having a slot provided on one side thereof adjacent to the controller, with the controller having a first cavity and a second cavity both provided on one side thereof adjacent to the retainer;
a controller mounted on the body and pivotable with respect to the guiding member between a first position and a second position;
a core set slideably received in the chamber and including a needle; and
a positioning mechanism disposed between the controller and the body, with the positioning mechanism installed to the slot of the retainer and selectively engaged with the first cavity and the second cavity to retain the controller in one of the first and second positions;
wherein while the controller is in the first position, the needle is slideable in the chamber and is adapted for coupling with a French type valve;
wherein while the controller is in the second position, the needle is abutted against the first end of the guiding member and is adapted for coupling with an American type valve.

6. The nozzle device as claimed in claim 5, wherein the guiding member and the retainer are integrally formed as one piece.

7. A nozzle device comprising:
a body including a guiding member having two opposing ends including a first end and a second end, with the first end of the guiding member having a chamber formed thereon, with the second end of the guiding member adapted for coupling with an air pump and having an aperture formed thereon and in communication with the chamber;
a controller mounted on the body and pivotable with respect to the guiding member between a first position and a second position, with the controller including a housing mounted to the guiding member and a switch coupled to the housing, with the switch having a slot provided on one side thereof adjacent to the guiding member, with the guiding member having a first cavity and a second cavity both provided on one side thereof adjacent to the switch;
a core set slideable received in the chamber; and
a positioning mechanism disposed between the controller and the body, with the positioning mechanism being installed to the slot and selectively engaged with the first cavity and the second cavity, with the positioning mechanism retaining the controller in one of the first and second positions;
wherein while the controller is in the first position, the needle is slideable in the chamber and is adapted for coupling with a French type valve;
wherein while the controller is in the second position, the needle is abutted against the first end of the guiding member and is adapted for coupling with an American type valve.

8. The nozzle device as claimed in claim 7, wherein the positioning mechanism includes a positioning unit and a plate disposed between the positioning unit and the elastic member, with one end of the elastic member abutted against the slot and the other end of the elastic member abutted against the plate to longitudinally press the plate and the positioning unit, wherein the positioning unit is selectively engaged with the first cavity and the second cavity.

9. A nozzle device comprising:
a body including a guiding member and a retainer, with the guiding member having two opposing ends including a first end and a second end, with the first end of the guiding member having a chamber formed thereon, with the second end of the guiding member adapted for coupling with an air pump and having an aperture formed thereon and in communication with the chamber, with the retainer having a through hole mounted to the guiding member and disposed between the first end and the second end, with the retainer having a slot provided on one side thereof adjacent to the controller, with the controller having a first cavity and a second cavity both provided on one side thereof adjacent to the retainer;
a controller mounted on the body and pivotable with respect to the guiding member between a first position and a second position;
a core set slideably received in the chamber and including a needle; and
a positioning mechanism disposed between the controller and the body and including a positioning unit, an elastic member and a plate disposed between the positioning unit and the elastic member, with one end of the elastic member abutted against the slot and the other end of the elastic member abutted against the plate to longitudinally press the plate and the positioning unit, with the positioning unit being installed to the slot of the retainer and selectively engaged with the first cavity and the second cavity to retain the controller in one of the first and second positions;
wherein while the controller is in the first position, the needle is slideable in the chamber and is adapted for coupling with a French type valve;
wherein while the controller is in the second position, the needle is abutted against the first end of the guiding member and is adapted for coupling with an American type valve.

10. A nozzle device comprising:
a body including a guiding member having two opposing ends including a first end and a second end, with the first end of the guiding member having a chamber formed thereon, with the second end of the guiding member adapted for coupling with an air pump and having an aperture formed thereon and in communication with the chamber;
a controller mounted on the body and pivotable with respect to the guiding member between a first position and a second position;
a core set slideably received in the chamber; and
a cover set coupled to the controller and including a cap mounted on the controller and a seal, with the cap having a compartment provided on one side thereof adjacent to the controller, with the compartment having a protrusion formed on a bottom wall thereof, with the cap further having a mounting portion formed on the other side thereof opposite to the controller and a orifice extending through the protrusion, with the orifice in communication with the compartment and the mounting portion, with the mounting portion having a groove formed on an inner peripheral wall thereof for receiving the seal, with the needle abutting against the protrusion to prevent the needle from moving toward the mounting portion of the cap;
wherein while the controller is in the first position, the needle is slideable in the chamber and is adapted for coupling with a French type valve;
wherein while the controller is in the second position, the needle is abutted against the first end of the guiding member and is adapted for coupling with an American type valve.

11. The nozzle device as claimed in claim 10, wherein the orifice has a threaded portion for coupling with the French type valve.

12. The nozzle device as claimed in claim 10, wherein the mounting portion has a threaded portion for coupling with the American type valve.

13. The nozzle device as claimed in claim 10, wherein the needle has an abutment portion and a limiting portion, wherein the needle has an limiting portion delimited by an outer periphery thereof, wherein the outer periphery of the limiting portion encloses a non-circle area that delimited the limiting portion, wherein the limiting portion has a first width which is a smallest width thereof and a second width which is a largest width thereof, wherein the abutment portion of the needle has a first diameter and the orifice of the cap has a second diameter, with the first diameter smaller than the second diameter, with the second width larger than the second diameter.

14. The nozzle device as claimed in claim 10, wherein the cover set includes a fixing unit, wherein the compartment has a groove formed on an inner peripheral wall thereof, wherein the fixing unit is installed between the housing and the cap and abuts against the groove and a flange of the housing.

15. The nozzle device as claimed in claim 10, wherein the cover set includes a fixing unit, wherein the cap has an outer threaded section provided on an outer periphery thereof, wherein the fixing unit has an inner threaded section corresponding to and coupled to the outer threaded section of the cap.

16. The nozzle device as claimed in claim 10 further comprising a positioning mechanism disposed between the controller and the body, wherein the positioning mechanism retains the controller in one of the first and second positions.

17. The nozzle device as claimed in claim 16, wherein the body includes a retainer, wherein the retainer has a through hole mounted to the guiding member and is disposed between the first end and the second end, wherein the retainer has a slot provided on one side thereof adjacent to the controller, wherein the controller has a first cavity and a second cavity both provided on one side thereof adjacent to the retainer, wherein the positioning mechanism is installed to the slot of the retainer and is selectively engaged with the first cavity and the second cavity.

18. A nozzle device comprising:
  a body including a guiding member having two opposing ends including a first end and a second end, with the first end of the guiding member having a chamber formed thereon, with the second end of the guiding member adapted for coupling with an air pump and having an aperture formed thereon and in communication with the chamber;
  a controller mounted on the body and pivotable with respect to the guiding member between a first position and a second position, with the controller including a housing, with the housing having a first section and a second section both formed on an inner peripheral wall thereof, with the second section having an inner diameter smaller than that of the first section, with the housing further having a limiting face formed between the first and second sections and abutting a flange of the first end of the guiding member to prevent the housing moving toward the first end of the guiding member; and
  a core set slideably received in the chamber;
  wherein while the controller is in the first position, the needle is slideable in the chamber and is adapted for coupling with a French type valve;
  wherein while the controller is in the second position, the needle is abutted against the first end of the guiding member and is adapted for coupling with an American type valve.

19. The nozzle device as claimed in claim 18, wherein the controller includes a switch coupled to the housing, wherein the housing has at least one groove provided on one end thereof distal from the second section and in communication with the first section, wherein the switch has at least one emboss protruded from an outer periphery thereof and corresponding to the groove, with the emboss coupled to the groove.

20. The nozzle device as claimed in claim 18, wherein the controller includes a switch coupled to the housing, wherein the housing has at least one groove provided on the first section thereof, wherein the switch has at least one emboss protruded from an outer periphery thereof and corresponding to the groove, with the emboss coupled to the groove.

* * * * *